(12) United States Patent
Hampton et al.

(10) Patent No.: US 7,600,458 B2
(45) Date of Patent: Oct. 13, 2009

(54) RECIPROCATING SAW BLADE WITH TAPERED TANG STEM

(75) Inventors: Stephen A. Hampton, East Longmeadow, MA (US); William B. Korb, Melrose, CT (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 11/106,907

(22) Filed: Apr. 15, 2005

(65) Prior Publication Data

US 2005/0235799 A1 Oct. 27, 2005

Related U.S. Application Data

(60) Provisional application No. 60/563,295, filed on Apr. 16, 2004.

(51) Int. Cl.
  B26D 1/00 (2006.01)
  B27B 19/09 (2006.01)

(52) U.S. Cl. .................. 83/698.11; 83/835; 83/847; 83/852; 30/392; 30/337; 30/355

(58) Field of Classification Search ............. 83/698.11, 83/835, 697, 848, 852, 847, 746, 851, 846, 83/854; D8/70; 30/292, 1, 329, 339, 337, 30/342, 394, 393, 355, 392, 514, 166.3
See application file for complete search history.

(56) References Cited

U.S. PATENT DOCUMENTS

| | | | |
|---|---|---|---|
| 2,987,086 A | | 6/1961 | Westlund, Jr. |
| 3,028,889 A | * | 4/1962 | McCarty ...................... 83/852 |
| 3,680,610 A | * | 8/1972 | Lindgren ..................... 83/835 |
| 3,686,799 A | * | 8/1972 | Doty ......................... 451/461 |
| 4,646,405 A | | 3/1987 | Reinhold |
| 5,575,071 A | * | 11/1996 | Phillips et al. ................. 30/392 |
| 5,584,123 A | * | 12/1996 | Chi ............................. 30/125 |
| 5,810,367 A | * | 9/1998 | Holzer et al. ................ 279/102 |
| 5,848,473 A | | 12/1998 | Brandenburg, Jr. |
| D427,865 S | | 7/2000 | Mills, Jr. |
| D448,634 S | | 10/2001 | Hickman |
| 6,438,848 B1 | * | 8/2002 | McHenry et al. .............. 30/161 |
| D465,138 S | | 11/2002 | Raines |
| D479,106 S | | 9/2003 | Robertsson |
| D479,107 S | | 9/2003 | Rack |
| D479,447 S | | 9/2003 | Rack |
| D482,945 S | | 12/2003 | Grolimund |
| 6,662,698 B2 | | 12/2003 | Wheeler et al. |
| D484,759 S | | 1/2004 | Rack |
| D485,140 S | | 1/2004 | Rack |
| D485,141 S | | 1/2004 | Rack |
| D485,142 S | | 1/2004 | Rack |
| D485,479 S | | 1/2004 | Rack |
| 6,725,548 B1 | * | 4/2004 | Kramer et al. ................ 30/392 |
| 6,782,781 B2 | * | 8/2004 | Rack ............................. 83/13 |
| 6,804,887 B2 | * | 10/2004 | Cheng ......................... 30/161 |

(Continued)

FOREIGN PATENT DOCUMENTS

JP 09201801 A 8/1997

*Primary Examiner*—Ghassem Alie
(74) *Attorney, Agent, or Firm*—McCarter & English, LLP

(57) ABSTRACT

There is provided a reciprocating saw blade having a tapered tang stem. The tang has a tang portion with at least three outer edges and a stem portion with at least three outer edges. The profiles of the tang portion and particularly the stem portion are such that they facilitate the effective and efficient engagement of the saw blade with any of numerous different keyed or keyless chucks of reciprocating saws. The tang/stem profile also advantageously provides for increased strength for resisting failure and/or fatigue stemming from a cutting force applied to the saw blade during use.

15 Claims, 4 Drawing Sheets

U.S. PATENT DOCUMENTS

| | | | |
|---|---|---|---|
| D534,401 S * | 1/2007 | Duffin et al. | D8/20 |
| 2002/0184988 A1 * | 12/2002 | Rohman et al. | 83/835 |
| 2003/0106407 A1 | 6/2003 | Wuensch et al. | |
| 2003/0121387 A1 | 7/2003 | Wheeler et al. | |
| 2003/0121388 A1 | 7/2003 | Wheeler et al. | |
| 2003/0192419 A1 * | 10/2003 | Conti | 83/837 |
| 2004/0261272 A1 * | 12/2004 | Moser | 30/160 |
| 2005/0132584 A1 * | 6/2005 | Cornwell et al. | 30/517 |

* cited by examiner

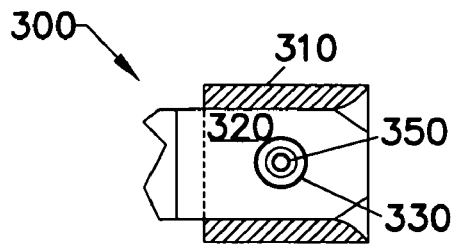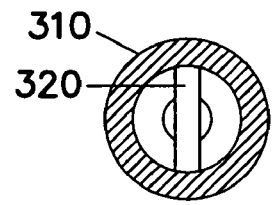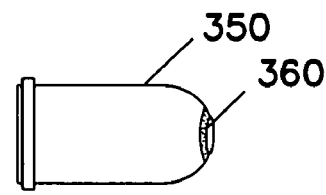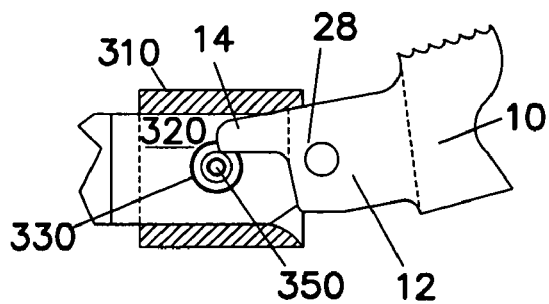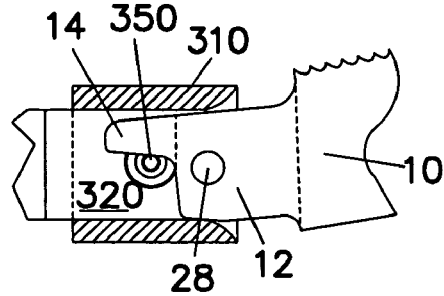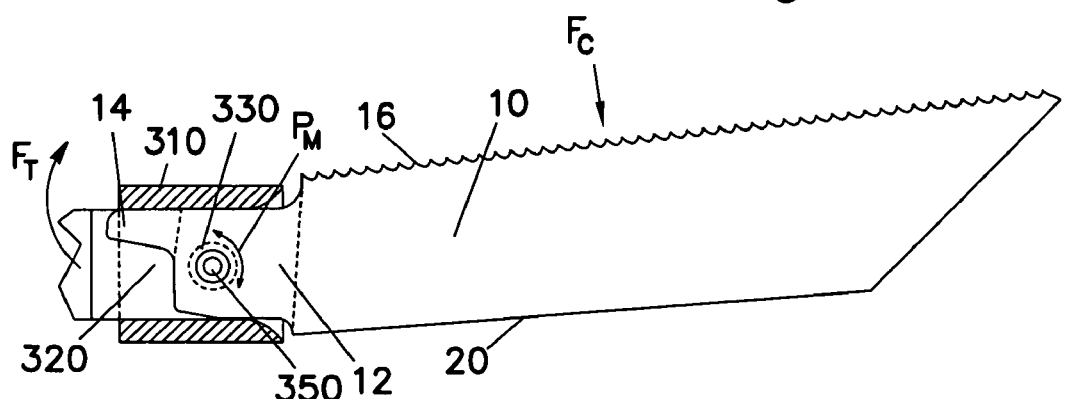

US 7,600,458 B2

RECIPROCATING SAW BLADE WITH TAPERED TANG STEM

CROSS-REFERENCE TO RELATED APPLICATION

This application claims priority on U.S. Provisional Application Ser. No. 60/563,295, filed Apr. 16, 2004, titled "Reciprocating Saw Blade with Tapered Tang Stem", which is hereby incorporated by reference in its entirety.

FIELD OF THE INVENTION

The present invention relates generally to saw blades, and more particularly, to reciprocating saw blades for cutting wood, metal and/or other materials, and that have tangs configured to withstand stresses created at the juncture of a tang body and a tang stem during cutting.

BACKGROUND INFORMATION

A typical reciprocating saw blade comprises a blade portion having a cutting edge defined by a plurality of teeth axially spaced relative to each other along one side of the blade, and a non-working edge formed on an opposite side of blade relative to the cutting edge. A tang for releasably connecting the blade to the chuck of a reciprocating saw has a tang body formed on the inner end of the blade and a tang stem formed on the inner end of the tang body. Typically, the tang defines an aperture therein for receiving a drive pin of a chuck. In order to fit properly within a chuck, the tang defines a more narrow width than the blade portion, and the tang stem defines a more narrow width than the tang.

Keyed chucks on reciprocating saws typically define a relatively narrow space for receiving the tang. In these types of chucks, the tang is fixedly engaged by the chuck throughout a relatively large surface area of the tang to fixedly secure the tang and tang stem of the blade within the chuck. In keyless chucks, on the other hand, a drive pin is received within the hole formed in the tang, and the chuck typically engages the tang stem so that its base, i.e., at the juncture of the tang and its stem, is subjected to relatively high stress loads. The forces created upon engaging a work piece with the reciprocating cutting edge of the blade create a moment about the drive pin engaging the hole in the tang. The torque at the drive pin creates relatively high stresses at the juncture of the tang and stem, and at the area extending between the points of tangency of the curvilinear portions of the tang formed at the juncture of the tang and blade portion. For example, tensile stresses are created at the inner areas of these blade portions (i.e., at the areas located on the cutting side of the blade), and compressive stresses are created at the outer areas of these blade portions (i.e., at the areas located on the non-working side of the blade). As a result, reciprocating saw blades typically fail at the juncture of the tang and stem, and/or at a line extending approximately between the points of tangency of the curvilinear portions of the tang formed at the juncture of the tang and blade portion.

Certain chucks have internal obstructions that require a relatively narrow tang stem to properly fit a reciprocating saw blade within the chuck. Other chucks do not have such obstructions. However, as described above, chucks typically engage the tang with a drive pin, and along the front edge of both the tang body and tang stem such that the juncture of the tang body and tang stem can be subjected to relatively high stresses. Thus, although it would be desirable to increase the width of the tang stem, particularly for use in chucks free of internal obstructions, in order to better withstand the tensile and compressive stresses created at the juncture of the tang body and tang stem, the overall width of the tang stem cannot be significantly increased without interfering with internal components associated with certain chucks. In addition, it would be desirable to increase the width of the tang at the juncture of the tang body and the cutting portion of the blade to better withstand the tensile and compressive forces created in this area during cutting. However, the width of the tang in this area cannot be significantly increased without preventing the tang from properly fitting within certain conventional reciprocating saw chucks.

Accordingly, it is an object of the present invention to overcome one or more of the above-described drawbacks and/or disadvantage of prior art reciprocating saw blades, and to provide a reciprocating saw blade that better withstands the forces which are created between the tang stem and the chuck, which typically result in stress and fatigue at the juncture of the tang body and the tang stem.

SUMMARY OF THE INVENTION

In accordance with one aspect, the present invention is directed to a reciprocating saw blade comprising a blade portion having a cutting edge defining a plurality of teeth, and a tang body having a first front edge, a first side edge and a first back edge. A tang stem is located on an opposite side of the tang body relative to the blade portion and has a second front edge, a second side edge and a second back edge. The tang stem defines a first width at a boundary region between the tang stem and the tang body, and a second width at another end of the tang stem relative to the boundary region defining the first width. The first width is greater than the second width to resist fatigue at the boundary region between the tang stem and the tang body.

In one embodiment of the present invention, the second back edge of the tang stem is oriented at an acute angle relative to the second front edge thereof. Also in this embodiment, the tang stem defines a tapered shape having three rectilinear side portions, and two curvilinear corner portions formed between the rectilinear side portions. In one such embodiment of the present invention, the acute angle is within the range of about 5° through about 25° with respect to either the second front edge of the tang stem or the first back edge of the tang body. In another such embodiment of the present invention, the acute angle is within the range of about 8° through about 15°. Also in one embodiment of the present invention, the first back edge of the tang body defines a chamfer at the juncture of the first back edge and first side edge thereof to facilitate insertion of the tang within a chuck.

In accordance with another aspect, the present invention is directed to a reciprocating saw blade comprising first means for cutting a work piece by reciprocating movement thereof, second means formed adjacent to the first means for releasably connecting the first means to a chuck of a reciprocating saw; and third means located on an opposite side of the second means relative to the first means for supporting the second means within the chuck of a reciprocating saw. The third means defines a first width at an interface of the second and third means, and a second width at another end of the third means relative to the interface defining the first width. The first width is greater than the second width to enhance the load-bearing cross-section and resist fatigue at the interface of the second and third means.

In one embodiment of the present invention, the first means is a cutting edge defined by a plurality of teeth. In one embodiment, the second means is a tang extending between the first and third means. In one embodiment, the third means is a tapered tang stem extending outwardly of the second means and defining a tapered configuration. In this embodiment, the base of the tang stem defines the first width and forms the boundary region between the tang stem and the second means, and a free end of the tang stem defines the second width less than the first width.

In an aspect of the present invention, there is provided a reciprocating saw blade that defines (i) a first curvilinear corner region extending between the first and second means and defining a first point of approximate tangency between the first curvilinear corner region and the second means; and (ii) and a second curvilinear corner region extending between the first and second means on an opposite side of the second means relative to the first curvilinear corner region, and defining a second point of approximate tangency between the second curvilinear corner region and the second means. In this embodiment, at least one of the first point of tangency and the second point of tangency is axially spaced relative to the other with respect to an elongated axis of the blade for increasing the load-bearing cross-section of a boundary region between the first and second means.

One advantage of the present invention is that the profile of the tang and tang stem facilitates effective and efficient engagement of the saw blade with any of a variety of different chucks or other clamping devices for reciprocating saws. The improved tang/stem profile of the present invention also advantageously provides for increased strength or resistance to fatigue in comparison to prior art reciprocating saw blades as described above, while nevertheless being usable with a variety of both keyed and keyless chucks.

These and other aspects and advantages of the currently preferred embodiments of the present invention will become more readily apparent in view of the following detailed description and accompanying drawings.

BRIEF DESCRIPTION OF THE DRAWINGS

FIG. 11 is a side sectional view of another chuck or clamping device usable with the reciprocating saw blade of FIG. 1;

FIG. 12 is an end sectional view of the clamping device of FIG. 11;

FIG. 13 is a side elevational view of a driving pin of the chuck or clamping device of FIG. 11;

FIG. 14 is a side sectional view of the clamping device of FIG. 11 and the tang of FIG. 1 in a first connecting state;

FIG. 15 is another side sectional view of the clamping device of FIG. 11 and the tang of FIG. 1 in a second connecting state; and FIG. 16 is another side sectional view of the clamping device of FIG. 11 and the tang of FIG. 1 in a third connecting state.

DETAILED DESCRIPTION OF THE CURRENTLY PREFERRED EMBODIMENTS OF THE INVENTION

Figure 1:
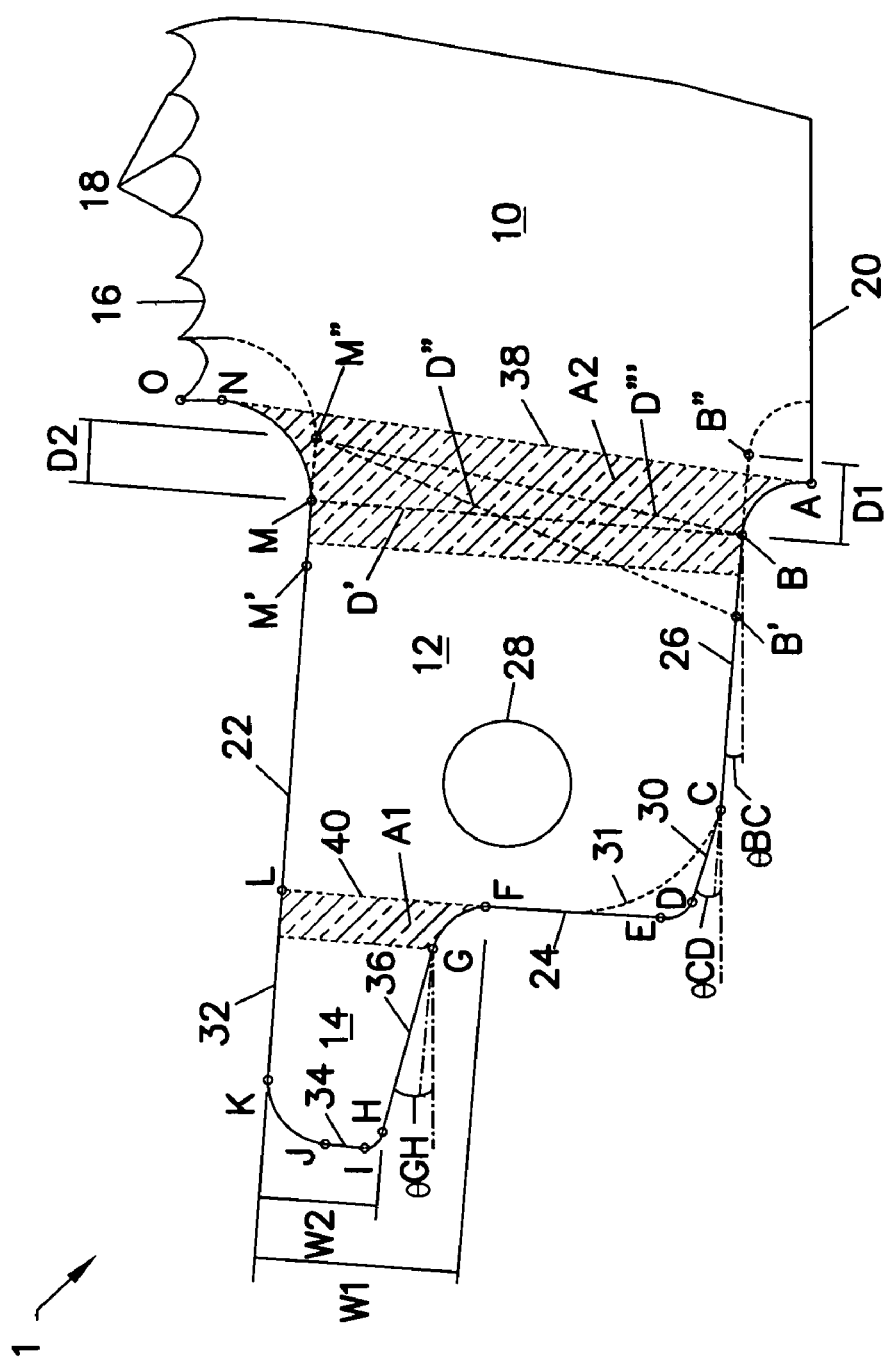
FIG. 1 is a partial, enlarged side elevational view of an end of a reciprocating saw blade in accordance with a preferred embodiment of the present invention.

Referring to the drawings and, in particular, FIG. 1, an enlarged end section of a reciprocating saw blade in accordance with an illustrative embodiment of the present invention is shown and generally represented by the reference numeral 1. As shown, the saw blade 1 has at least a blade portion 10, a tang portion 12, and a stem portion 14. The illustrated blade portion 10, tang portion 12 and stem portion 14 are integrally formed and/or connected. However, as may be recognized by those of ordinary skill in the pertinent art based on the teachings herein, the various portions of the blade may be constructed in any of numerous different ways that are currently known, or later become known. The word "tang" is used herein to mean the portion or projection on or otherwise associated with the blade by which it is attached to a chuck or other device for cutting work pieces with the blade, the words "tang body" or "tang portion" are used herein to mean the main part of the tang that is directly adjacent to the blade, and the words "tang stem", "stem portion" or "stem" are used herein to mean a connecting or supporting part of the blade and/or the tang of the blade.

The blade portion 10 has a front or working edge 16 defined by a plurality of teeth 18 disposed along the blade portion. The working edge 16 and/or the various teeth 18 associated therewith may have any of a variety of different shapes, profiles and/or tooth or pitch patterns that are suitable to accomplish any of a variety of cutting operations, including without limitation cutting wood, metal, plastic and/or other materials. The blade portion 10 also has a back or non-working edge 20 that is opposite to and spaced a predefined distance from the working edge 16. The non-working edge 20, as shown, is parallel to the working edge 16. However, in other aspects of the present invention, the orientation, shape and configuration of the non-working edge 20, like that of the working edge 16, may vary as needed to accomplish different cutting operations or otherwise as desired.

Still referring to FIG. 1, the tang portion 12 has a first front edge 22, a first side edge 24, and a first back edge 26. The first front edge 22, as shown, is preferably offset a predefined distance from the working edge 16 of the blade portion 10. The degree of offset may vary depending on any of a variety of factors, including the type of blade, the type of cutting tool utilizing the blade, and/or the clamping device associated with the cutting tool. The first front edge 22 also may be oriented at a predefined angle with respect to the working edge 16 (or with respect to a plane extending between the tips of adjacent teeth). In one currently preferred embodiment of the present invention, the angle is approximately 5°. However, as may be recognized by those of ordinary skill in the pertinent art based on the teachings herein, this angle is only exemplary and may be changed as desired or otherwise required based on any of a variety of factors, including the type of blade, the type of cutting tool utilizing the blade, and/or the clamping device associated with the cutting tool. In addition, the shape and/or configuration of the first front edge 22 may vary in other aspects of the present invention in order to effectively cooperate with any of a variety of chucks or other clamping devices.

The first side edge 24 is preferably substantially perpendicular to the first front edge 22, although it need not be. The first side edge 24, as shown, may be substantially straight or linear and also may be substantially perpendicular to the first back edge 26. In other aspects of the present invention, not shown, the first side edge 24 may have any of a variety of different shapes and/or configurations. The first side edge 24 also may have any of a variety of angular orientations with respect to the first front edge 22 and/or the first back edge 26.

The first back edge 26, as shown, is preferably offset a predefined distance from the non-working edge 20 of the blade portion 10. The degree of offset may vary depending on the type of blade, the type of cutting tool utilizing the blade and/or the clamping device associated with the cutting tool. The first back edge 26 also may be oriented at a predefined angle with respect to the non-working edge 20. The degree of angle may, as with the offset, vary depending on any of a variety of factors, including the type of blade, the type of cutting tool utilizing the blade, and/or the clamping device associated with the cutting tool. It is noted that, as with both the first front edge 22 and the first side edge 24, the shape and/or configuration of the first back edge 26 may be varied in other aspects of the present invention.

The tang portion 12 further defines a tang aperture 28 and a tang chamfer 30. One purpose of the tang aperture 28 is to increase the strength and otherwise enhance the safety associated with clamping or connecting the saw blade 1 to a particular clamping device (e.g., a keyed or keyless chuck) by use of a connecting element (e.g., a stud or pin) through the tang aperture 28 whenever the configuration or construction of the clamping device permits. Thus, the tang aperture 28 may be shaped, sized and/or configured to operatively accommodate any of a variety of different connecting elements. In addition, in other aspects of the present invention, not shown, the tang aperture 28 may be entirely omitted without departing from the spirit and/or scope of the invention.

The tang chamfer 30, as shown, forms a part of the first back edge 26 of the tang portion 12. The tang chamfer 30 is preferably a straight or linear segment that is oriented at a predefined angle with respect to the rest of the first back edge 26. The degree of angle and overall length of the chamfer may vary depending on any of a variety of factors, including the type of blade, the type of cutting tool utilizing the blade, and/or the clamping device associated with the cutting tool. One purpose of the tang chamfer 30 is to facilitate the effective and efficient insertion of the tang portion 12 into a variety of different chucks or other clamping devices. It is noted that in other aspects of the present invention, the chamfer 30 may be substantially curvilinear without any rectilinear segments, such as shown by dashed line 31 of FIG. 1.

Referring still to FIG. 1, the stem portion 14 has a second front edge 32, a second side edge 34, and a second back edge 36. The second front edge 32, as shown, is preferably aligned with and parallel to the first front edge 22 of the tang portion 12 and thus, offset a predefined distance from the working edge 16 of the blade portion 10. The degree of offset may vary depending on a variety of factors, including the type of blade, the type of cutting tool utilizing the blade, and/or the clamping device associated with the cutting tool. The second front edge 32 of the stem portion 14, in other aspects of the present invention, not shown, need not be aligned with the first front edge 22 of the tang portion 12 and may be offset from, or oriented at an angle with respect to, the first front edge 22 of the tang portion 12. The degree of offset and/or the degree of angle may be varied as needed.

The second side edge 34 is preferably at least substantially perpendicular to the second front edge 32 and/or the working edge 16, although it need not be. The second side edge 34, as shown, may be substantially straight or linear. In other aspects of the present invention, not shown, the second side edge 34 may have various different shapes and/or configurations. For example, the second side edge 34 may be entirely curvilinear with no rectilinear portions therein. The second side edge 34 also may have various different angular orientations with respect to the second front edge 32 and/or the second back edge 36.

The second back edge 36, as shown, is offset a predefined distance from the first back edge 26 of the tang portion 12. The degree of offset may be varied depending on any of a variety of factors, including the type of blade, the type of cutting tool utilizing the blade and/or the chuck or other clamping device associated with the cutting tool. The second back edge 36 of the tang stem also is oriented at a predefined angle with respect to the first and second front edges 22 and 32, respectively (or with respect to the first back edge 26 of the tang portion 12 and/or the non-working edge 20 of the blade portion 10). The degree of angle may, as with the offset, be varied depending on any of a variety of factors, including the type of blade, the type of cutting tool utilizing the blade, and/or the chuck or other clamping device associated with the cutting tool. In a preferred aspect of the present invention discussed in further detail hereafter, the second back edge 36 is oriented with respect to the second front edge 32 so that the distance or width W1 of the stem portion 14 at the stem base, or the intersection between the stem portion 14 and tang portion 12, is greater than the distance or width W2 at the stem head, or the end opposing the tang/stem intersection, of the stem portion 14. In the illustrated embodiment of the present invention, the width W1 is within the range of about 0.22 inch to about 0.26 inch, and more preferably is within the range of about 0.223 inch to about 0.255 inch. The width W2 is preferably within the range of about 0.11 inch to about 0.15 inch.

Still referring to FIG. 1, having identified the significant features of the present invention, a preferred profile of both the tang portion 12 and the stem portion 14 follows:

Starting from point A, at the intersection of the blade portion 10 and the tang portion 12, with the tang portion 12 being theoretically demarcated from the blade portion 10 by a first dotted line 38 and the stem portion 14 being theoretically demarcated from the tang portion 12 by a second dotted line 40, the tang/stem profile extends angularly a predefined distance along line AB to point B. The line AB defines a predetermined curvilinear shape. From point B, the tang/stem profile extends a predefined distance along line BC to point C. The line BC is at least substantially a straight line that is oriented at a predefined angle θBC with respect to the non-working edge 20 of the blade portion 10. The degree of the angle θBC may be anywhere in the range from about 0° to about 10° with respect to the non-working edge 20. From point C, the tang/stem profile extends another predefined distance along line CD to point D. The line CD is at least substantially a straight line that is oriented at a predefined angle θCD with respect to line BC. The degree of the angle θCD may be anywhere in the range from about 0° to about 25° with respect to line BC. The angle θCD alternatively may be determined with respect to the non-working edge 20 of the blade portion or other desired reference surface. From point D, the tang/stem profile extends angularly a predefined distance along line DE to point E. The line DE defines a predetermined curvilinear shape. From point E, the tang/stem profile extends a predefined distance along line EF to point F. The line EF is at least substantially a straight line that is oriented at a predefined angle preferably at least substantially perpendicular to the first and/or second front edges 22 and 32, respectively.

From point F, the tang/stem profile extends angularly a predefined distance along line FG to point G. The line FG defines a predetermined curvilinear shape, and preferably extends throughout an arc within the range of about 85° to about 65°, and more preferably within the range of about 82° to about 75°. From point G, the tang/stem profile extends a predefined distance along line GH to point H. In a currently preferred embodiment of the present invention, the line GH is at least substantially a straight line that is oriented at a predefined angle θGH with respect to the first and second front edges 22 and 32, respectively (or with respect to the non-working edge 20 of the blade portion 10, the line BC, the line CD and/or other desired reference surface). The angle θGH is preferably within the range of about 5° to about 25° with respect to line KL, and more preferably is within the range of about 8° to about 15°. As may be recognized by those of ordinary skill in the pertinent art based on the teachings herein, the line GH defining the second back edge 36 of the tang stem may have a shape other than the illustrated rectilinear shape, such as a curvilinear shape, or a shape defined by one or more curvilinear and/or rectilinear portions. From point H, the tang/stem profile extends angularly a predefined distance along line HI to point I. The line HI defines a predetermined curvilinear shape. From point I, the tang/stem profile extends a predefined distance along line IJ to point J. The line IJ is at least substantially a straight line that is oriented at a predefined angle preferably at least substantially parallel to the line EF and thus, at least substantially perpendicular to the line CD and/or the line BC. However, as may be recognized by those skilled in the pertinent art based on the teachings herein, line IJ is only exemplary and in other aspects of the present invention may be changed or eliminated as desired. From point J, the tang/stem profile extends angularly a predefined distance along line JK to point K. The line JK defines a predetermined curvilinear shape. From point K, the tang/stem profile extends a predefined distance along line KL to point L. The line KL is at least substantially a straight line that is oriented at a predefined angle preferably at least substantially perpendicular to the line IJ and/or the line EF and thus, at least somewhat parallel with the line CD and/or the line BC. It is noted that a line between point L and point F defines the second dotted line 40, which in turn identifies the base of the stem portion 14 and the theoretical intersection between the stem portion 14 and the tang portion 12.

From point L, the tang/stem profile extends a predefined distance along line LM to point M. The line LM is at least substantially a straight line that is oriented at a predefined angle preferably at least substantially perpendicular to the line IJ and/or the line EF and thus, at least somewhat parallel to the like KL, the line CD, and/or the line BC. From point M, the tang/stem profile extends angularly a predefined distance along line MN to point N. The line MN defines a predetermined curvilinear shape. Finally, from point N, the tang/stem profile extends a predefined distance along line NO to point O. The line NO is at least substantially a straight line that is oriented at a predefined angle preferably at least substantially parallel to the line IJ and/or the line EF and thus, at least somewhat perpendicular to the line CD and/or the line BC. However, as may be recognized by those skilled in the pertinent art based on the teachings herein, line NO is only exemplary and in other aspects of the present invention can have any of a variety of configurations. For example, line NO, in other aspects of the present invention, may entirely curvilinear. The point O, as shown, is located on the working edge 16 of the blade portion 10, which edge is preferably at least substantially parallel to the non-working edge 20 of the blade portion 10. It is noted that a line between point O and point A defines the first dotted line 38, which in turn identifies the base of the tang portion 16 and the theoretical intersection between the tang portion 16 and the blade portion 10. It is noted that although the orientation of angles θBC, θCD and θGH have been identified by reference to specific edges or reference lines, each angle alternatively may be determined by reference to any of several other edges or reference surfaces of the blade.

Figure 2:
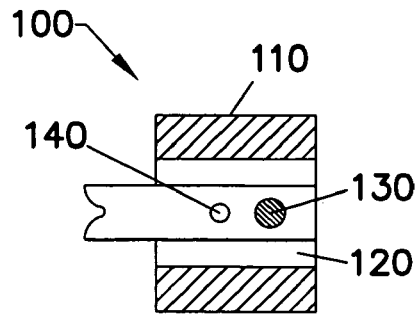
FIG. 2 is a side sectional view of a chuck or clamping device usable with the reciprocating saw blade of FIG. 1.
Figure 3:
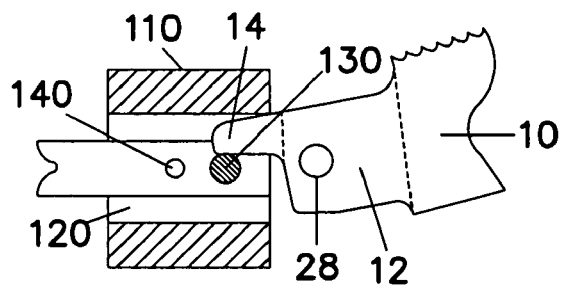
FIG. 3 is a side sectional view of the chuck or clamping device of FIG. 2 and the tang of the reciprocating saw blade of FIG. 1 in a first connecting state.
Figure 4:
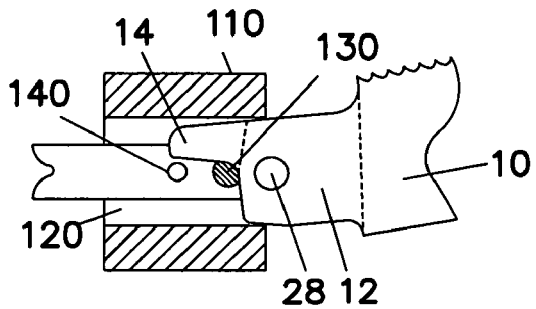
FIG. 4 is another side section view of the clamping device of FIG. 2 and the tang of FIG. 1 in a second connecting state.
Figure 5:
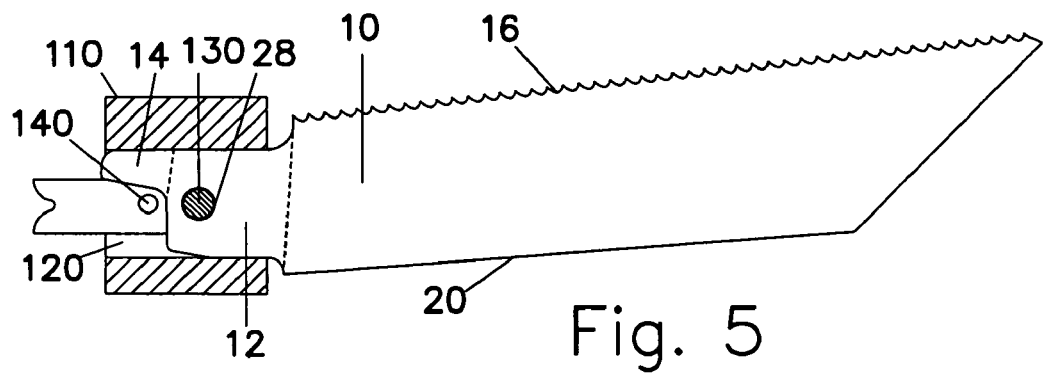
FIG. 5 is another side sectional view of the clamping device of FIG. 2 and the tang of FIG. 1 in a third connecting state.

Referring now to FIG. 2, an illustrative aspect of a chuck or clamping device suitable for use with the present invention is indicated, generally by the reference numeral 100. The clamping device 100 may have a retaining collar 110 suitable to encompass at least the stem portion 14 and the tang portion 12 of the saw blade 1. The retaining collar 110 preferably has and/or forms a slot or socket 120 suitable to receive and retain the stem portion 14 and the tang portion 12 of the saw blade 1. As shown, the socket 120 may be provided with one or more apertures 130 suitable for accommodating a drive pin (not shown) or the like. Further, the socket 120 has one or more inner structures 140, such as rib structures, pin structures or the like, that can inhibit or limit effective access to the socket 120. Thus, as shown in FIGS. 3 through 5, the tang/stem profile in accordance with the present invention, and as described above with respect to FIG. 1, facilitates the effective insertion of the stem portion 14 and the tang portion 12 into the socket 120 and the engagement of the saw blade 1 with the retaining collar 110. More particularly, the stem portion 14, with the relatively rounded second side edge 34 and the narrowed width W2 of the stem head with respect to the width W1 of the stem base providing an overall tapered configuration, is suitable to effectively navigate the inner structures 140 of the socket 120 thereby facilitating the insertion of the stem portion 14 and the tang portion 12 into the socket 120. Further, as shown in FIG. 4, the chamfer 30 associated with the first back edge 26 of the tang portion 12 and the preferably rounded edges thereof facilitate the effective insertion of the stem portion 14 and the tang portion 12 in particular. However, as may be recognized by those skilled in the pertinent art based on the teachings herein, the chamfer 30 is exemplary and in other aspects of the present invention may be changed or eliminated as desired.

Figure 6:
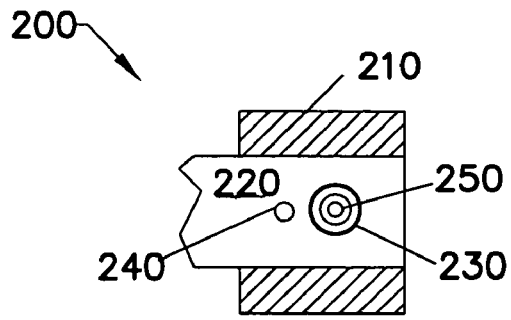
FIG. 6 is a side sectional view of another chuck or clamping device usable with the reciprocating saw blade of FIG. 1.
Figure 7:
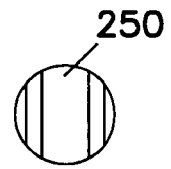
FIG. 7 is a side view of a driving pin of the chuck or clamping device of FIG. 6.
Figure 8:
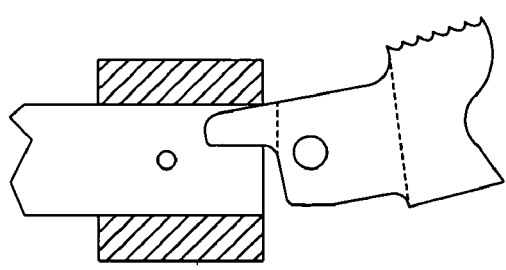
FIG. 8 is a side sectional view of the clamping device of FIG. 6 and the tang of FIG. 1 in a first connecting state.
Figure 9:
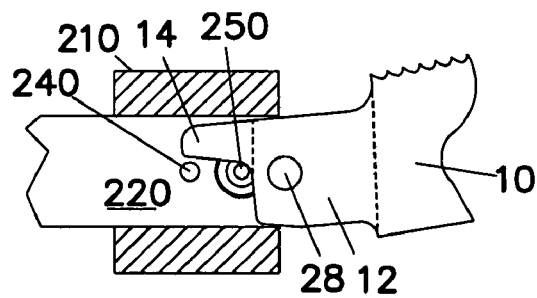
FIG. 9 is another side sectional view of the clamping device of FIG. 6 and the tang of FIG. 1 in a second connecting state.

Referring to FIG. 6, another illustrative aspect of a chuck or clamping device suitable for use with the reciprocating saw blades of the present invention is indicated generally by the reference numeral 200. The clamping device 200 is similar to the clamping device 100, having any of the features associated therewith as previously described, and thus like reference numerals preceded by the numeral "2" instead of the numeral "1" are used to indicate like elements. The clamping device 200 has a retaining collar 210 that is rotatable and suitable to encompass at least the stem portion 14 and the tang portion 12 of the saw blade 1. The retaining collar 210 has and/or forms a slot or socket 220 suitable to receive and retain the stem portion 14 and the tang portion 12 of the saw blade 1. As shown, the socket 220 may be provided with one or more apertures 230 suitable for accommodating a drive pin 250 such as shown in FIG. 7. The drive pin 250, as shown, may be a ball element; however, as may recognized by those of ordinary skill in the pertinent art based on the teachings herein, the drive pin may take any of numerous different shapes or configurations that are currently or later become known for performing the function of the drive pin. The drive pin 250 is sized to traverse the tang aperture 28 as the retaining collar 210 pushes inwardly on the drive pin 250 to effectively secure the saw blade 1 to the clamping device 200. In addition, the socket 220 may have one or more inner structures 240, such as rib structures, pin structures or the like, that can inhibit or limit effective access to the socket 220. Thus, as shown in FIGS. 8 through 10, the tang/stem profile in accordance with the present invention, and as described above with respect to FIG. 1, facilitates the effective insertion of the stem portion 14 and the tang portion 12 into the socket 220 and the engagement of the saw blade 1 with the retaining collar 210 in a manner substantially similar to that described above with respect to FIGS. 2 through 5.

Figure 10:
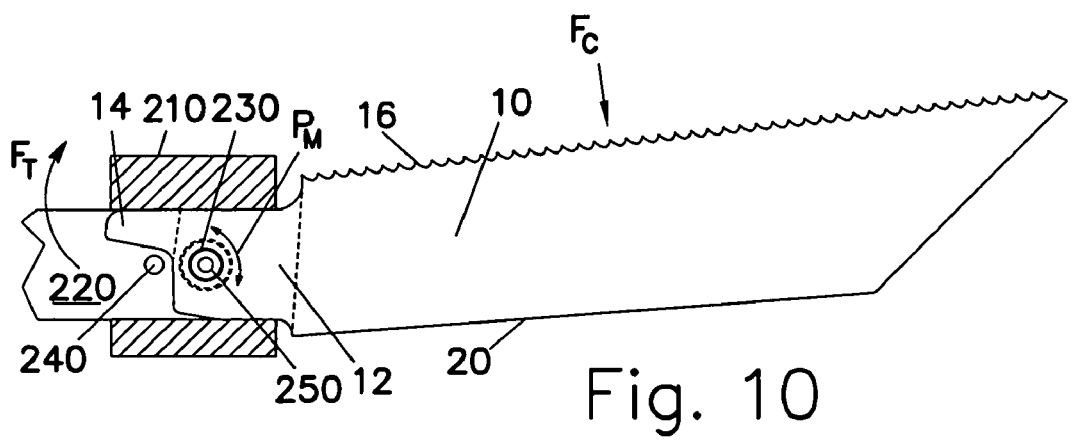
FIG. 10 is another side sectional view of the clamping device of FIG. 6 and the tang of FIG. 1 in a third connecting state.

A significant advantage of the reciprocating saw blades of the present invention in comparison to prior art reciprocating saw blades as described above, is that the greater width W1 of the stem base relative to the width W2 of the stem head (or the tapered shape of the tang stem giving rise to the increased width W1 at the base of the stem) provides an increase in overall strength and an improved resistance to stress related fatigue such as, for example, failure due to the torque FT and moment PM about the drive pin 250, and exerted on the stem as a result of the cutting forces FC imparted on the cutting edge 16 during a cutting operation, as indicated in FIG. 10.

Referring to FIGS. 11 and 12, another illustrative aspect of a chuck or clamping device suitable for use with the reciprocating saw blades of the present invention is indicated generally by the reference numeral 300. The clamping device 300 may be similar to the clamping device 100 and/or clamping device 200 described above, and therefore like reference numerals preceded by the numeral "3" instead of the numerals "1" and/or "2" are used to indicate like elements. The clamping device 300 has a retaining collar 310 that is rotatable and suitable to encompass at least the stem portion 14 and the tang portion 12 of the saw blade 1. The retaining collar 310 preferably has and/or forms a slot or socket 320 suitable to receive and retain both the stem portion 14 and the tang portion 12 of the saw blade 1. As shown, the socket 320 is provided with one or more apertures 330 suitable for accommodating a drive pin 350 such as shown in FIG. 13. The drive pin 350, as shown, is somewhat elongated with a rounded nipple or tip 360 and is suitable for traversing the tang aperture 28 to effectively secure the saw blade 1 to the clamping device 300 such that the cutting forces result in a moment PM thereabout (FIG. 16). In this aspect of the present invention, it is notable that the socket 320 does not have any inner structures inhibiting or limiting effective access thereto. Thus, both the tang portion 12 and the stem portion 14 may be easily inserted into the socket 320 of the clamping device 300. Further, the tapered configuration of the tang stem (and/or the greater width W1 at the base of the tang stem in comparison to the more narrow width W2 at the head of the tang stem) increases the overall strength and resistance of the tang stem to fatigue or, other, failure during cutting operations.

The tang/stem profile as described above with respect to FIG. 1, in addition to facilitating effective and efficient insertion into the socket of any of a variety of different chucks or clamping devices both with and without inner access-inhibiting structures (e.g., both keyed and keyless chucks), also provides increased strength at a key blade area A1 that is exposed to relatively high tensile and/or compressive stresses resulting from the cutting force FC exerted on the working edge 16 of the saw blade during use. As shown in FIG. 1, the area A1 tends to correspond at least approximately to the stem base or to the intersection between the stem portion 14 and the tang portion 12 (i.e., the area extending between and about points F and L). During cutting operations, the area adjacent to points F and G (where G is the point of tangency between the curvilinear portion FG and the rectilinear portion GH) is subjected to a relatively high compressive stress or loading, and the area adjacent to point L is subjected to a relatively high tensile stress or loading. Accordingly, in a preferred aspect of the present invention, the tang/stem profile provides for a greater width W1 at the stem base relative to the width W2 at the stem head. This wider cross-section at the stem base provides increased strength and resistance to fatigue and/or failure at area A1 resulting from the moment PM about the drive pin and the torque FT caused by the cutting force FC applied to the saw blade during use.

In an alternative embodiment of the present invention, and with reference to the broken line illustrations in FIG. 1, the point B defining the point of tangency ("POT") between the curvilinear portion AB and the non-working edge 20 of the blade portion 10, and/or the point M defining the POT between the curvilinear portion MN and the working edge 16 of the blade portion 10, may be moved or shifted laterally with respect to the elongated axis or direction of the blade and relative to the position shown in FIG. 1 to increase the straight-line distance between the points B and M (or POTs) and thereby create a wider load bearing cross-section between the POTs in comparison to that shown in FIG. 1. For example, the point M may be moved laterally either to the left in the drawing to the location M', or to the right to the location M", and/or the point B may be moved laterally either to the left in the drawing to the location B', or to the right to the location B". In one such alternative embodiment, the POT M is shifted to the right in the drawing a predefined distance D2 to point M" to thereby increase the straight-line distance between the POTs BM from the distance D' to the distance D'". In another alternative embodiment, the POT M is shifted to the right in the drawing to point M" and the POT B is shift to the left in the drawing to the point B' to thereby increase the straight-line distance between the POTs from the distance D' to the distance D". In the currently contemplated embodiments, distance D1 or D2 (or the sum of D1 and D2 if both POTs are shifted laterally) is at least about 0.015 inch, is preferably at least about 0.03 inch, and is most preferably within the range of about 0.03 inch to about 0.25 inch. The increased linear distance between the POTs B and M create a wider load bearing cross-section that, in turn, provides increased strength and resistance to fatigue and/or failure within the blade region or area A2.

Thus, having identified and described some of the features/aspects of the present invention, it is apparent that the present invention provides for a reciprocating saw blade having an improved tang and/or tang stem that advantageously allows for the effective and efficient insertion and/or removal of the tang and tang stem into any of a variety of chucks or other clamping devices that may be associated with reciprocating saws or other cutting tools. The improved tang of the present invention also advantageously provides for increased structural strength at one or more key areas to resist failure and/or fatigue stemming from a cutting force applied to the saw blade during use.

The present invention having been thus described with particular reference to the preferred forms thereof, it will be obvious that various changes and modifications may be made therein without departing from the spirit of the present invention as defined herein.

What is claimed is:

1. A reciprocating saw blade engageable with a chuck of a reciprocating saw for driving the reciprocating saw blade in a reciprocating motion, the reciprocating saw blade comprising:

a blade portion having a cutting edge located on a side of the blade and defining a plurality of teeth;

a tang engageable with a chuck of a reciprocating saw and including a first front edge, a first side edge and a first back edge; and a stem located on an opposite side of the tang relative to the blade portion and having a substantially planar second front edge located on the same side of the blade as the cutting edge, a second side edge, a second back edge opposite the second front edge, a first corner at a junction of the first side edge of the tang and the second back edge of the stem, and a second corner at a junction of the second back edge and the second side edge of the stem, wherein the first corner defines a curvilinear corner region extending throughout an arc within the range of about 85° to about 65° between a first point of tangency with the first side edge of the tang and a second point of tangency with the second back edge of the stem, the second back edge of the stem tapers inwardly from the second point of tangency to the second corner of the stem at an angle within the range of about 5° through about 25° such that the stem defines a tapered shape that extends between a boundary region of the stem and tang and the second side edge of the stem, the stem has a first width at the boundary region and a second width at the second side edge, and the first width is greater than the second width to resist fatigue at the boundary region.

2. A reciprocating saw blade as defined in claim 1, wherein the first width is within the range of about 0.22 inch to about 0.26 inch, and the second width is within the range of about 0.1 inch to about 0.15 inch.

3. A reciprocating saw blade as defined in claim 1, wherein the angle is within the range of about 8° and about 15°.

4. A reciprocating saw blade as defined in claim 1, wherein the first back edge of the tang defines a chamfer at the juncture of the first back edge and first side edge thereof to facilitate insertion of the tang within a chuck.

5. A reciprocating saw blade as defined in claim 1, wherein the stem defines a third corner at a junction of the second front edge and the second side edge of the stem, and the second and third corners of the stem define curvilinear corner regions extending between the second side edge and the second front and back edges for facilitating insertion of the stem within a chuck.

6. A reciprocating saw blade as defined in claim 2, wherein the first width is within the range of about 0.223 inch to about 0.255 inch.

7. A reciprocating saw blade as defined in claim 4, wherein the chamfer is oriented at an acute angle within the range from about 0° to about 25° relative to the first back edge.

8. A reciprocating saw blade as defined in claim 1, further defining a front curvilinear corner region extending between the first front edge of the tang and the blade portion and defining a frontal point of approximate tangency between the first front edge and the front curvilinear corner region, and a back curvilinear corner region extending between the first back edge of the tang and the blade portion and defining a back point of approximate tangency between the first back edge and the back curvilinear corner region, and wherein the back point of tangency is axially spaced toward the stem relative to the frontal point of tangency by at least about 0.015 inch with respect to an elongated axis of the blade for resistance to fatigue at a boundary region between the blade portion and tang.

9. A reciprocating saw blade as defined in claim 8, wherein the frontal point of tangency is axially spaced relative to the back point of tangency by a distance within the range of about 0.03 inch to about 0.25 inch.

10. A reciprocating saw blade as defined in claim 1, wherein the second front edge of the stem is substantially parallel to the first front edge of the tang.

11. A reciprocating saw blade engageable with a chuck of a reciprocating saw for driving the reciprocating saw blade in a reciprocating motion, the reciprocating saw blade comprising:

first means for cuffing a work piece by reciprocating movement thereof;

second means including a first front edge, a first side edge and a first back edge for releasably connecting the first means to a chuck of a reciprocating saw; and third means located on an opposite side of the second means relative to the first means for supporting the second means within the chuck of a reciprocating saw, wherein the third means includes a substantially planar second front edge located on the same side of the blade as the cutting edge, a second side edge, a second back edge opposite the second front edge, a first corner at a junction of the first side edge of the second means and the second back edge of the third means, and a second corner at a junction of the second back edge and the second side edge of the third means, wherein the third means includes fourth means for resisting fatigue at a boundary region of the second and third means including a curvilinear corner region extending throughout an arc within the range of about 85° to about 65° between a first point of tangency with the first side edge of the second means and a second point of tangency with the second back edge of the third means, the second back edge of the third means tapering inwardly from the second point of tangency to the second corner of the third means at an angle within the range of about 5° through about 25° and forming a tapered shape that extends between the boundary region of the second and third means and the second side edge of the third means, and the third means having a first width at the boundary region that is greater than a second width at the second side edge.

12. A reciprocating saw blade as defined in claim 11, wherein the angle is within the range of about 8° through about 15°.

13. A reciprocating saw blade as defined in claim 11, wherein the first width is within the range of about 0.22 inch to about 0.26 inch, and the second width is within the range of about 0.1 inch to about 0.15 inch.

14. A reciprocating saw blade as defined in claim 11, wherein the blade further defines a front curvilinear corner region extending between the first front edge of the second means and the first means and defining a frontal point of approximate tangency between the first front edge and the front curvilinear corner region, and a back curvilinear corner region extending between the first back edge of the second means and the first means and defining a back point of approximate tangency between the first back edge and the back curvilinear corner region, and wherein at least one of the frontal point of tangency and the back point of tangency is axially spaced relative to the other by at least about 0.015 inch with respect to an elongated axis of the blade to resist fatigue at a boundary region between the first means and the second means.

15. A reciprocating saw blade as defined in claim 11, wherein the first means is a cutting edge, the second means is a tang, the third means is a tapered stem, and the fourth means is defined by a region of the blade at the intersection of the tang and stem defining the curvilinear corner region and the first width.

* * * * *